(No Model.)

E. A. BAYER, F. NUESS & F. SCHAFFITZEL.
WAGON WRENCH.

No. 567,561. Patented Sept. 8, 1896.

WITNESSES:
J. Landsing
Estelle M. Titus

INVENTORS
Ernest A. Bayer,
F. Nuess &
F. Schaffitzel
by Edward P. Thompson
ATTORNEY.

THE NORRIS PETERS CO., PHOTO-LITHO., WASHINGTON, D. C.

UNITED STATES PATENT OFFICE.

ERNEST A. BAYER, FRANK NUESS, AND FREDERICK SCHAFFITZEL, OF KANSAS CITY, MISSOURI.

WAGON-WRENCH.

SPECIFICATION forming part of Letters Patent No. 567,561, dated September 8, 1896.

Application filed October 29, 1895. Serial No. 567,333. (No model.)

*To all whom it may concern:*

Be it known that we, ERNEST A. BAYER, FRANK NUESS, and FREDERICK SCHAFFITZEL, citizens of the United States, and residents of Kansas City, in the county of Jackson, State of Missouri, have invented certain new and useful Improvements in Wagon-Wrenches, of which the following is a specification.

Our present invention relates to a simple device for removing and putting back nuts from the axles of wagons by the swing of the wheel in cases where the ordinary wrench will not suffice.

Figure 1:
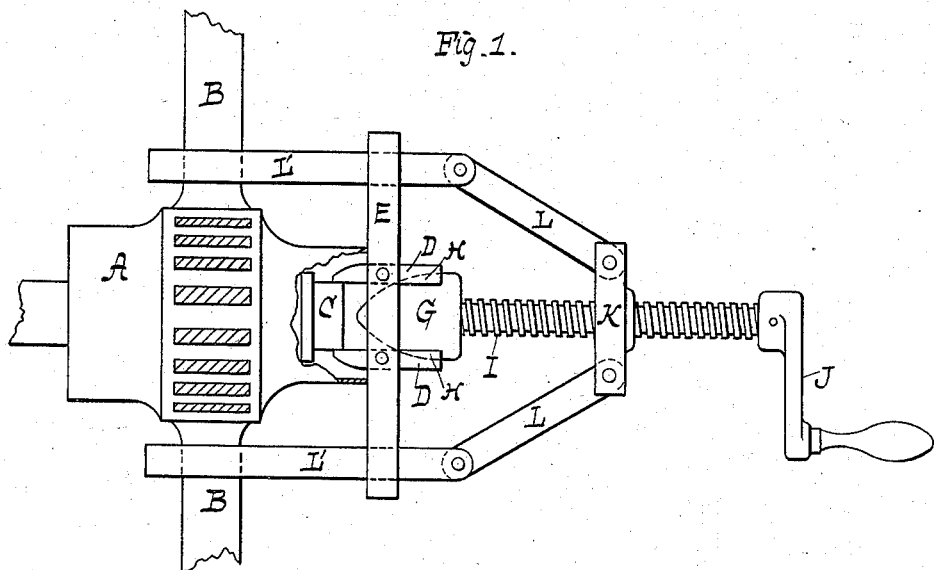
Figure 2:
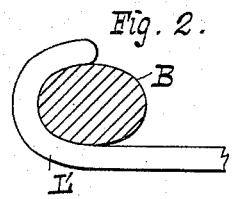
Figure 3:
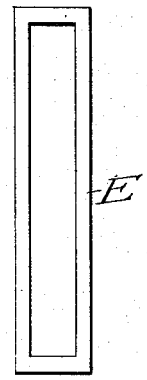

All the details of the device are represented in Figure 1, which shows a portion of a wheel to which is applied the wrench in condition for working. Fig. 2 is a different view of one of the details on a little different scale. Fig. 3 is another view of the frame E, shown in Fig. 1.

A is the hub, and B the spokes, of the wheel.

C is the nut which holds the wheel upon its axle.

D represents the jaws of the wrench, and are shown clamping the nut C, and are pivoted between the sides of the frame E, so that their ends may be adapted to fit upon nuts of different sizes within reasonable limits. The jaws project beyond the frame E, measured from the nut, and are grooved on one side to receive the conical wedge G. (Shown dotted.) The grooves are located at H. The conical wedge G is carried at one end of the screw I, and the crank J at the other end. The screw passes through the nut K. The said nut K is carried by and pivoted to arms L, which are pivoted to opposite sides of the nut K, and they are also pivoted to two connecting-rods L', which are hooked at the outer ends and thereby clasp the spokes B. The connecting-rods L' pass between the the sides of the frame E.

The operation of the invention may be stated as follows: Place the rods L' so as to clasp the opposite spokes B in the manner represented in Fig. 2, and place the jaws D upon opposite sides of the nut C. Then turn the crank J. It will cause the wedge G to pry open the outer ends of the jaws D and to press the other ends with great force upon the nut C. The spokes serve to resist any strain, and serve to drive the jaws upon the nut when the wedge G is driven toward the nut C. Now, a great deal of purchase may be applied to the nut C by taking hold of the spoke of the wheel and turning the same. The nut C cannot resist this great torsional power and therefore becomes loosened.

The advantages of the wrench are, in short, as follows: If desired, the device may be retained on the wheel and will keep the nut tight in the wheel in the same position, so that it has no chance to fall down on the ground and get full of sand or mud. A person need not take hold of the nut with his hand and get his fingers all full of axle-grease. It can be used on buggies, carriages, spring-wagons, farm or any other heavy wagons, as it makes no difference if the hub is small or large or if the nut has six instead of four sides, as is often the case. It usually takes a man only half the time to grease a wagon with this wrench.

We claim as our invention—

A wagon-wrench, consisting of the combination of connecting-rods L', for clasping the spokes of a given wheel, a rectangular frame, between whose sides are pivoted jaws for clamping the nut upon the axle of the wheel and extending beyond the frame where there are grooves in the jaws, a conical wedge located in the grooves and carried at one end of the screw I which is provided with a crank at the other end, a nut through which passes the said screw and to which are pivoted arms L, connecting with the rods L' that pass through said frame.

ERNEST A. BAYER. [L. S.]
  FRANK NUESS. [L. S.]
  FRED. SCHAFFITZEL. [L. S.]

Witnesses to signature of Ernest A. Bayer:
 S. W. HOGGE,
 OTTO SCHMIDT.

Witnesses to signatures of Frank Nuess and Fred. Schaffitzel:
 ANDREW J. HOUSMAN,
 BEN E. NOBLE.